Figure 1:
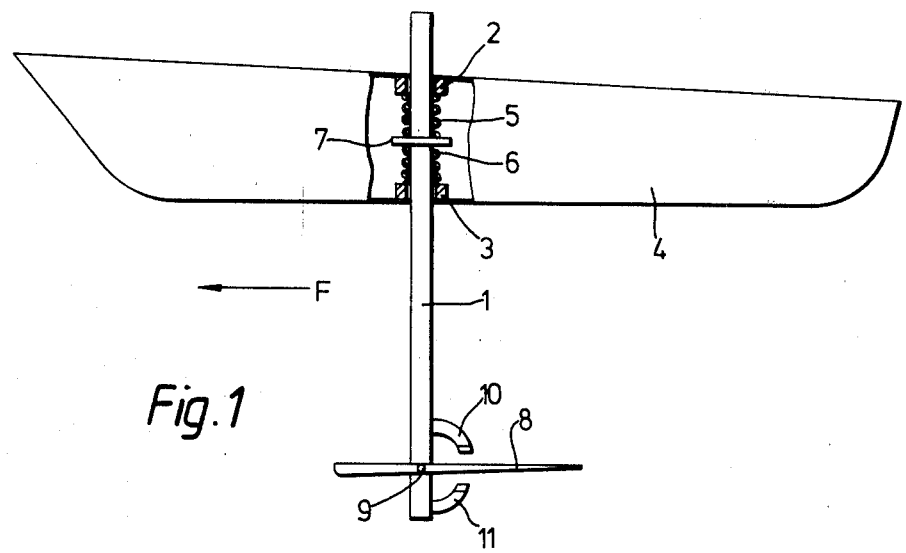

United States Patent [19]

Jakobsen

[11] 4,371,347
[45] Feb. 1, 1983

[54] WAVE MOTOR, ESPECIALLY FOR PROPULSION OF BOATS

[76] Inventor: Einar Jakobsen, Roven, N-1920 Sørumsand, Norway

[21] Appl. No.: 136,918

[22] Filed: Apr. 3, 1980

[30] Foreign Application Priority Data

Apr. 4, 1979 [NO] Norway .................. 791132

[51] Int. Cl.³ .......................................... B63H 19/02
[52] U.S. Cl. ........................................ 440/9; 440/13
[58] Field of Search ................... 440/9, 10, 13, 14, 15; 267/11 R, 11 A, 70, 150; 188/314; 415/7.8; 416/85, 79; 417/436; 290/42, 53

[56] References Cited

U.S. PATENT DOCUMENTS

| | | | |
|---|---|---|---|
| 913,624 | 2/1909 | Daniel | 416/79 |
| 1,066,896 | 7/1913 | Frame | 440/9 |
| 1,532,459 | 4/1925 | White | 440/9 |
| 2,021,815 | 11/1935 | Strout | 440/9 |
| 2,367,765 | 1/1945 | Fickler | 440/9 |
| 2,520,804 | 8/1950 | Hollar | 440/9 |
| 2,812,954 | 11/1957 | Lyon | 188/314 X |
| 3,190,592 | 6/1965 | Grizzle, Jr. | 267/150 X |

FOREIGN PATENT DOCUMENTS

| | | | |
|---|---|---|---|
| 1039712 | 10/1953 | France | 267/11 R |
| 278185 | 10/1930 | Italy | 114/279 |
| 914997 | 1/1963 | United Kingdom | 440/9 |

Primary Examiner—Trygve M. Blix
Assistant Examiner—Stephen P. Avila
Attorney, Agent, or Firm—Scully, Scott, Murphy & Presser

[57] ABSTRACT

A wave motor for propulsion of a floating device, especially a watercraft, comprises a downwards extending supporting structure connected to the craft. An essentially horizontally disposed, plate-like tilting element, at a forwrad portion thereof as viewed in the cruising direction, is pivotally connected to the lower end of the supporting structure. This arrangement results in a tilting movement as a result of relative movement between the tilting element and the surrounding water when the craft is floating on the water and is raised and lowered due to wave action, the tilting movement being limited by upper and lower stops arranged on the supporting structure. The supporting structure is arranged to effect an essentially vertical, relative movement in relation to the craft, and is maintained in an intermediate position and returned to this position when it has been moved away from the intermediate position by influence of wave forces.

5 Claims, 3 Drawing Figures

WAVE MOTOR, ESPECIALLY FOR PROPULSION OF BOATS

The present invention relates to a wave motor for propulsion of a floating device, especially a watercraft, com-prising a downwards extending supporting structure connected to the craft, and an essentially horizontally disposed, platelike tilting element which, at a forward portion thereof as viewed in the cruising direction, is pivotally connected to the lower end of the supporting structure, to effect a tilting movement as a result of relative movement between the tilting element and the surrounding water when the craft is floating on the water and is raised and lowered due to wave action, the tilting move-ment being limited by means arranged on the supporting structure.

Wave motors of this type are e.g. known from U.S. Pat. Nos. 2,021,815 and 2,367,765. In these known wave motors the tilting elements are rotatably connected to the supporting structure for tilting about an axis extending transversely to the cruising direction. During said relative movement between the tilting element and the surrounding water the tilting element is tilted in one or the other direction to rest against one or the other of a pair of abutment means or stops arranged on the supporting structure, whereby further relative movement causes a change of the flow direction of the water flowing towards the tilting element, so that the water is guided rearwards by the tilting element, in the direction opposite to the desired cruising direction. Thereby there is created a reaction force acting on the tilting element and driving the watercraft or vessel in the cruising di-rection.

When using this system, some drawbacks exist. The impact of the tilting element against the stops will cause an abrupt stop of the tilting element, and this will be able to propagate as impacts to the craft or vessel and cause discomfort for persons aboard the vessel, and also possibly cause material failure. In addition there is also a risk for breakdown or average if the craft or floating device is subjected to a really large wave. The tilting element will then, after having struck against one of the stops, keep the craft down, so that the wave will come over the craft at the same time as the supporting structure is subjected to a large and uncontrolled force. Further, in a trough of the sea the craft will tend to be lifted out of the water.

With large waves the large vertical forces which then occur between craft and tilting element, will cause large eddy formations around the tilting element, and the energy of the wave will then be badly utilized.

The object of the invention is to eliminate the abovementioned drawbacks in connection with previously known wave motors of the aforementioned type.

According to the invention this object is achieved in that the supporting structure is operable to effect an essentially vertical relative movement in relation to the craft, means being provided to keep the supporting structure in an intermediate position and return it to this position when it has been moved away from the intermediate position by influence of wave forces.

Figure 3:
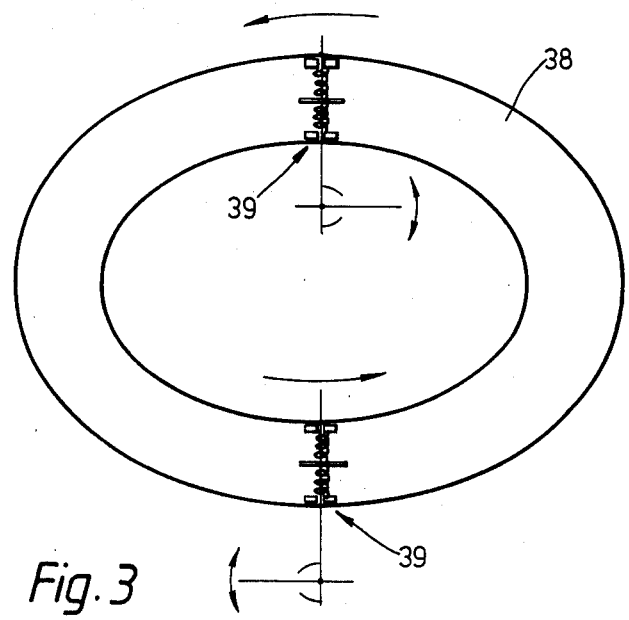
Figure 2:
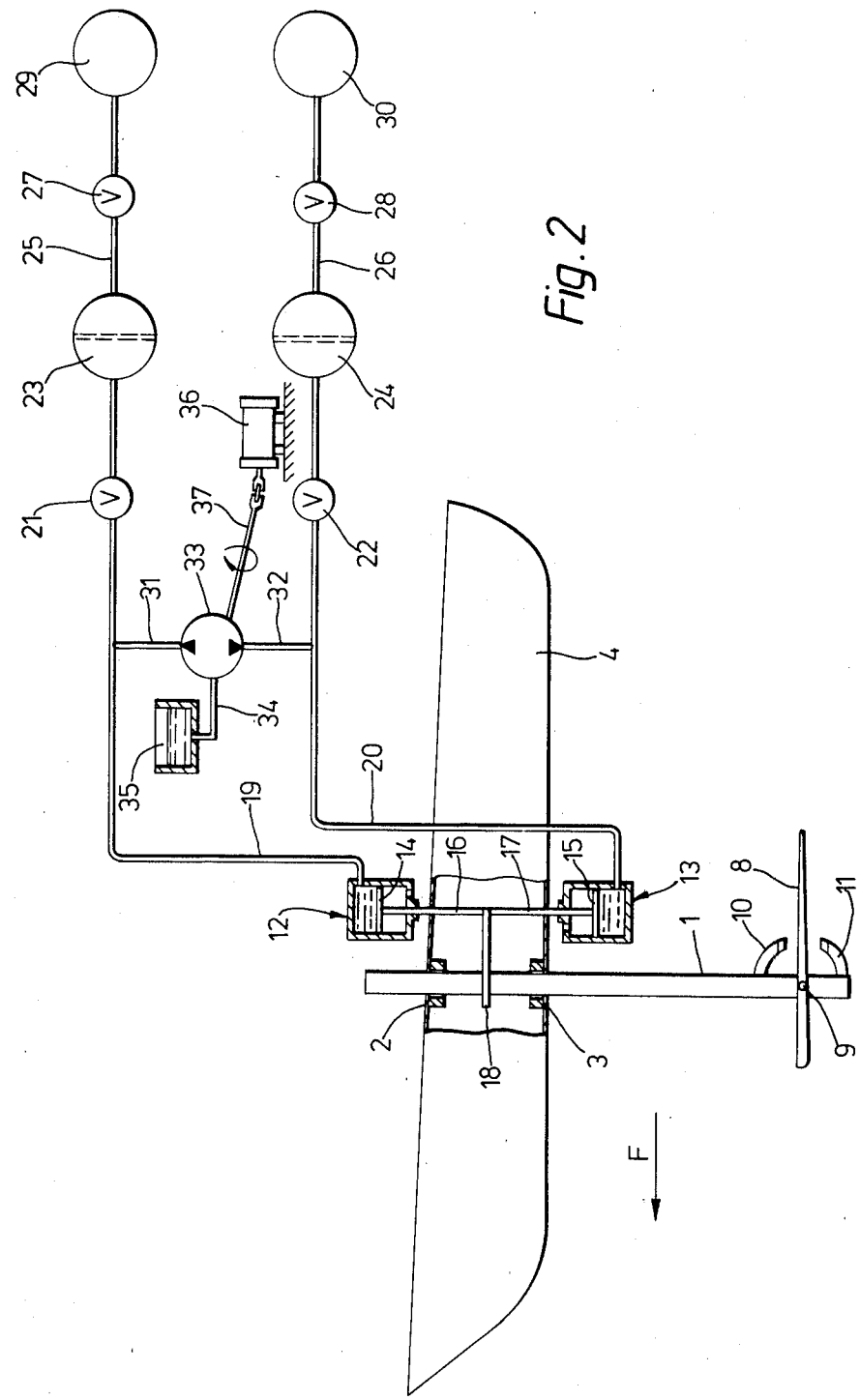

The invention will be described more closely in the following in connection with exemplary embodiments with reference to the accompanying drawings, wherein FIG. 1 shows a partly sectioned, schematic side view of a wave motor according to the invention;

FIG. 2 shows a schematic view of another embodiment of a wave motor according to the invention; and FIG. 3 shows a schematic view of an annular, floating device which is provided with a pair of wave motors according to the invention.

In the embodiment illustrated in FIG. 1 the supporting structure comprises a rod-shaped body 1 which at its upper end is axially displaceably mounted in a pair of bushings 2 and 3, so that the rod body may slide up and down therein. The bushings are fixedly connected to the craft or boat 4. The rod body 1 is kept in a vertical, intermediate position in relation to the boat 4 by means of resilient means which in the illustrated embodiment comprises a pair of helical springs 5 and 6 disposed on the rod body on opposite sides of a holder or collar 7 attached to the rod, the springs being fixed or clamped between the collar and a respective one of the two bushings 2 and 3. Conveniently the rod 1 has oval cross-sectional shape, so that it may not turn about its longitudinal axis.

At the lower end of the rod body 1 a platelike tilting element or water foil 8 is pivotally connected to the supporting structure above an axis 9, so that the water foil may tilt up and down and deflect to a certain tilting angle which, in the illustrated embodiment, is limited by an upper and a lower stop 10 and 11, respectively, attached to the rod body.

When the boat 4 illustrated in FIG. 1 moves from a wave-trough to a wave-crest, the tilting element 8 will, as a result of the fact that it is located in more calm water at a distance below the water surface, be tilted down at its rear edge until it is stopped by the lower stop 11. This causes that water which is located immediately above the tilting element, is pressed rearwards, which results in that a forward-directed reaction force is applied to the boat, which force drives the boat forwards in the direction of the illustrated arrow F. A further upward movement of the boat results in that the lower spring 6 is tensioned. In this way the vertical forces acting between the craft and the tilting element, have been brought under control by means of the spring force, and thus one avoids the drawbacks associated with the previously known wave motor devices discussed above.

When the wave culminates, the spring force is released so that the tilting element 8 retains its excursion or deflection angle during an additional time and provides extra propulsive force or thrust in this time interval.

When the boat 4 moves downwards in a trough of the sea, the rear edge of the tilting element 8 will move upwards, and the upper spring 5 will be tensioned and be released in a corresponding manner when the wave arrives at its minimum.

In FIG. 2 there is shown another embodiment of the wave motor wherein the resilient means comprises a hydraulic/pneumatic system with hydraulic cylinders 12 and 13 replacing the mechanical springs 5 and 6. The two cylinders contain respective pistons 14 and 15, respectively, which through associated piston rods 16 and 17, respectively, are connected to the holder 18 attached to the rod body 1. Each cylinder 14 resp. 15 connected is through a conduit 19 resp. 20 with an associated valve 21 resp. 22 connected to a conventional hydraulic accumulator 23 resp. 24 which is provided with a diaphragm dividing the inner space of the accumulator in two rooms. The cylinders 12, 13, the conduits 19, 20 and the accumulator rooms connected thereto, are filled with hydraulic fluid, e. g. oil. The other rooms of the accumulators 23, 24 are filled with a pressurized gas and are through conduits 25, 26 with associated valves 27 and 28, respectively, connected to gas containers 29 and 30.

The conduits 19 and 20 connecting the cylinders 12, 13 with the accumulators 23, 24, have branches 31, 32 connected to the output side of a pump 33 having an inlet conduit 34 coming from a tank 35 containing hydraulic fluid. A driving means for the pump 33 is illustrated schematically by a motor 36 operating through a shaft 37 to drive the pump 33. The pump arrangement shall be able to supply pressure fluid to either of the tubes 19 and 20, such as described below.

When the hydraulic/pneumatic system according to FIG. 2 is used as wave propulsion means similarly to the embodiment shown in FIG. 1, the valves 21, 22 are open whereas the valves 27, 28 are closed and the pump 33 is stopped. A wave raising the boat 4 will cause the tilting element 8 to tilt with its rear edge, the deflection or excursion being limited by the lower stop 11. A further upwards movement of the boat 4 will result in that the rod body 1 is moved downwards, and because of the movement of the piston 15 in the cylinder 13 hydraulic fluid will be pressed out from the cylinder and into the hydraulic accumulator 24 through the conduit 20, so that the gas in the gas room of this accumulator will be gradually compressed. Simultaneously, liquid will be drawn out from the other accumulator 23 through the conduit 19 to the cylinder 12. When the force on the tilting element 8 decreases as a result of the culmination of the wave, the pressure in the cylinder 13 will bring the rod body 1 back to its intermediate position.

By opening one or both of the valves 27, 28 in the conduits 25, 26, a connection is provided between the accumulators 23, 24 and the gas containers 29, 30. The available gas volume will then be increased, so that the spring characteristic of the system may be changed.

By closing of the valve 21, 22 the rod body 1 may be locked in a desired position. By means of the hydraulic pump 33 and its motor 36 the rod 1 may then be moved continuously from one extreme position to the other, so that it will function as a hydraulic/mechanic propulsion device together with the tilting element 8.

The boat can thus be propelled by wing 8 as bar 1 is reciprocated up and down by motor 36 driving pump 33, which is coupled to cylinders 12 and 13 to driven piston rods 16 and 17 in opposition. In this system the fluid couplings between pump 33 and cylinders 12 and 13 are arranged to drive cylinders 12 and 13 in opposition, in a reciprocating up and down fashion, in arrangements as are known in the art. In these arrangements, the cylinders 12,13 are, on the conduit side, filled with liquid, as are the conduits 19,20, and the motor 36 drives pump 33. When the rod 1 is to be driven downwardly, liquid is pumped through the conduit 19 to the space above the piston 14 in the cylinder 12. Simultaneously, there is a connection from the lower space of cylinder 13, through the conduit 20 to the suction side of the pump. When the piston rods 16,17 are pressed downwardly by the liquid pressure on the piston 14, the liquid below the piston 15 is directed to the pump 33. The valves 21,22 are closed during this operation. When the rod 1 is to be driven upwardly, the pumping direction is reversed, and the conduit 20 leads the liquid pressure to the cylinder 13 wherein the piston 15 pushes the piston rods 16,17 and the rod 1 upwardly. The liquid above the piston 14 is now directed to the inlet or suction side of the pump 33. The reservoir 35 ensures that the system is filled with liquid. The reversal of fluid couplings between the upward and downward ward strokes of the cylinders 12,13 can take any suitable arrangements, as is known in the art.

It is obvious that also other drive systems may be used for the rod movement. For example there may be used direct motor operation with toothed wheel and rack. One has then the possibility to use combined propulsion of the boat by means of wave and motor operation in the event that the waves are too small to provide the necessary speed to the boat. By means of the motor the rod 1 with the tilting element 8 is then driven downwards in a wave which is on its way upwards, and is driven upwards in a wave which is on its way downwards.

Further, if one has sufficiently large waves, energy may be stored or accumulated by means of the movement of the rod body. This may be done in that the movement of the rod is braked or retarded by means of an electric generator, or in that hydraulic or pneumatic pressure is built up and utilized in the boat. Further it is also possible to store energy in that a flywheel is brought into rotation. In many cases it may be an advantage that the tilting element during reception of energy through the rod body, may be locked in or adjacent to its neutral position.

It should also be remarked that the wave motor device described above may also be modified or combined with the wave motor device disclosed in the Applicant's Norwegian patent No. 140 231 (corresponding to German OS 2 848 864), to thereby further optimize the propulsion efficiency. The tilting element is then, instead of the stops illustrated herein, provided with a e.g. mechanically resilient means which always tries to bring the element back to its neutral or horizontal position.

The wave motor device according to the present invention may advantageously be utilized for operation or propulsion of many different types of floating devices. Thus, in the schematic perspective view in FIG. 3 there is shown an annular floating structure 38 which is provided with a pair of quite schematically illustrated wave motor devices 39 of the embodiment shown in FIG. 1. Such a floating structure may be provided with one, two or more such wave motors, which may possibly be modified such as suggested above, so that they are driving the possibly anchored floating structure in a rotating movement. By way of example this principle may be used to drive a floating structure by means of wave force, which structure is provided with means for the production of e.g. electric energy by means of the achieved propulsive or rotational movement.

What I claim is:

1. A wave motor for propulsion of a floating device, especially a watercraft, comprising:
   a downwards extending supporting structure connected to said craft;
   an essentially horizontally disposed, platelike tilting element which, at a forward portion thereof, as viewed in the cruising direction, is pivotally connected to the lower end of said supporting structure, to effect a tilting movement as a result of relative movement between the tilting element and the surrounding water when said craft if raised and lowered due to wave action;
   a means being arranged on said supporting structure to limit the tilting movement of said element;

a means enabling said supporting structure to effect an essentially vertical movement in relation to said craft; and a means to keep said supporting structure in an intermediate position and return it to said position when it has been moved away from said intermediate position by influence of wave forces.

2. A wave motor according to claim 1, wherein said supporting structure comprises a rod-like body which at its upper end is axially displaceably mounted in relation to said craft, and which is held in said intermediate position by means of resilient means.

3. A wave motor according to claim 2, wherein said resilient means comprises a pair of springs which are fixed on opposite sides of a holder attached to said rod body, so that said springs are acting in opposite directions axially along said rod body.

4. A wave motor according to claim 2, wherein said resilient means comprises a hydraulic/pneumatic means including a pair of hydraulic cylinders with associated pistons which are connected to said rod body to act in opposite axial directions along the body, each of said hydraulic cylinders being connected to an accumulator containing a diaphragm which is influenced by a pressurized gas.

5. A wave motor according to claim 4, wherein said hydraulic cylinders are connected to their associated accumulators through closable valves, and a hydraulic pump is provided which is adapted to drive said pistons in a reciprocating movement causing a corresponding movement of said rod body with said tilting element.

* * * * *